US008744920B2

(12) United States Patent
Aldomar et al.

(10) Patent No.: US 8,744,920 B2
(45) Date of Patent: Jun. 3, 2014

(54) SYSTEMS AND METHODS FOR INTEGRATION OF TRAVEL AND RELATED SERVICES AND OPERATIONS

(75) Inventors: Jose-Manuel Aldomar, Toronto (CA); Ramez Hanna, Toronto (CA)

(73) Assignee: Guestlogix, Inc., Toronto (CA)

( * ) Notice: Subject to any disclaimer, the term of this patent is extended or adjusted under 35 U.S.C. 154(b) by 0 days.

(21) Appl. No.: 13/253,961

(22) Filed: Oct. 5, 2011

(65) Prior Publication Data
US 2012/0150686 A1 Jun. 14, 2012

Related U.S. Application Data

(60) Provisional application No. 61/390,067, filed on Oct. 5, 2010, provisional application No. 61/530,111, filed on Sep. 1, 2011.

(51) Int. Cl.
G06Q 30/00 (2012.01)
(52) U.S. Cl.
USPC .......................................................... 705/26.1
(58) Field of Classification Search
USPC .......................................................... 705/26.1
See application file for complete search history.

(56) References Cited

U.S. PATENT DOCUMENTS

| | | | |
|---|---|---|---|
| 5,367,452 A | 11/1994 | Gallery et al. |
| 5,412,193 A | 5/1995 | Swartz |
| 5,873,069 A | 2/1999 | Reuhl et al. |
| 5,973,619 A | 10/1999 | Paredes |
| 6,003,008 A | 12/1999 | Postrel et al. |
| 6,014,090 A | 1/2000 | Rosen et al. |
| 6,060,993 A | 5/2000 | Cohen |
| 6,133,853 A | 10/2000 | Obradovich et al. |
| 6,151,582 A | 11/2000 | Huang et al. |
| 6,177,887 B1 | 1/2001 | Jerome |

(Continued)

FOREIGN PATENT DOCUMENTS

| | | |
|---|---|---|
| DE | 4443018 | 6/1996 |
| EP | 1455293 | 9/2004 |

(Continued)

OTHER PUBLICATIONS

International Search Report and Written Opinion for International Application No. PCT/IB2012/002458 dated Mar. 13, 2013.

(Continued)

Primary Examiner — Mila Airapetian
(74) Attorney, Agent, or Firm — Patterson Thuente Pedersen, PA

(57) ABSTRACT

One aspect of the invention is directed to integrating mobile devices, such as smartphones, tablets, etc., into a mobile retail environment commercial system. A mobile device includes a mobile store module that provides an interactive user experience that allows a traveler to browse goods or services that are available in the mobile retail environment. The device further includes a mobile store inventory records module that maintains records of goods and services that are available in each particular mobile retail environment. An update module facilitates data connectivity with a remote server to update the stored data in the mobile store inventory records module. The remote server, in turn, is communicatively coupled with a transportation service provider system, such as an airline business system that provides information on individual travelers and their itineraries. The mobile device further includes an in-flight data exchange module that facilitates interaction with a point-of-sale device.

12 Claims, 21 Drawing Sheets

(56) References Cited

U.S. PATENT DOCUMENTS

| | | |
|---|---|---|
| 6,188,991 B1 | 2/2001 | Rosenweig et al. |
| 6,343,317 B1 | 1/2002 | Glorikian |
| 6,390,366 B1 | 5/2002 | Heidenreich et al. |
| 6,460,020 B1 | 10/2002 | Pool et al. |
| 6,609,107 B1 | 8/2003 | Shim |
| 6,754,636 B1 | 6/2004 | Walker et al. |
| 6,873,260 B2 | 3/2005 | Lancos et al. |
| 6,882,290 B2 | 4/2005 | French et al. |
| 6,920,319 B2 | 7/2005 | Knutsson et al. |
| 6,988,078 B1 | 1/2006 | Heidenreich et al. |
| 7,103,008 B2 | 9/2006 | Greenblat et al. |
| 7,171,369 B1 | 1/2007 | Bertram et al. |
| 7,177,826 B2 | 2/2007 | Nishiwaki et al. |
| 7,206,757 B2 | 4/2007 | Seigel et al. |
| 7,298,327 B2 | 11/2007 | Dupray et al. |
| 7,493,083 B2 | 2/2009 | Fuccello |
| 7,535,367 B2 | 5/2009 | Ratnakar |
| 7,599,691 B1 | 10/2009 | Mitchell |
| 7,658,323 B2 | 2/2010 | Kleinman et al. |
| 7,681,790 B2 | 3/2010 | Birmingham et al. |
| 7,685,953 B2 | 3/2010 | Giles |
| 7,747,704 B2 | 6/2010 | Parupudi et al. |
| 7,783,507 B2 | 8/2010 | Schick et al. |
| 7,797,204 B2 | 9/2010 | Balent |
| 7,853,272 B2 | 12/2010 | Tipnis et al. |
| 8,328,094 B2 | 12/2012 | Proud et al. |
| 2001/0016825 A1 | 8/2001 | Pugliese, III et al. |
| 2001/0037250 A1 | 11/2001 | Lefkowitz |
| 2001/0051876 A1 | 12/2001 | Seigel et al. |
| 2002/0049656 A1 | 4/2002 | Lancos et al. |
| 2002/0087384 A1 | 7/2002 | Neifeld |
| 2002/0087522 A1 | 7/2002 | MacGregor et al. |
| 2002/0143655 A1 | 10/2002 | Elston et al. |
| 2002/0178451 A1 | 11/2002 | Ficco |
| 2003/0023456 A1* | 1/2003 | Dilollo et al. .................... 705/1 |
| 2003/0046701 A1 | 3/2003 | O'Donnell |
| 2003/0093323 A1 | 5/2003 | Kenyon |
| 2003/0093798 A1 | 5/2003 | Rogerson |
| 2003/0172090 A1 | 9/2003 | Asunmaa et al. |
| 2003/0191698 A1 | 10/2003 | Brown et al. |
| 2003/0220841 A1 | 11/2003 | Maritzen |
| 2003/0229897 A1 | 12/2003 | Frisco et al. |
| 2004/0210450 A1 | 10/2004 | Atencio et al. |
| 2005/0132407 A1 | 6/2005 | Boyer, Jr. et al. |
| 2006/0242027 A1 | 10/2006 | Falic |
| 2007/0050279 A1 | 3/2007 | Huang et al. |
| 2007/0112673 A1 | 5/2007 | Protti |
| 2007/0136140 A1 | 6/2007 | Smith |
| 2007/0198432 A1 | 8/2007 | Pitroda et al. |
| 2008/0132212 A1 | 6/2008 | Lemond et al. |
| 2009/0006181 A1 | 1/2009 | Ghosh et al. |
| 2009/0077620 A1 | 3/2009 | Ravi et al. |
| 2009/0132813 A1 | 5/2009 | Schibuk |
| 2009/0172035 A1 | 7/2009 | Lessing et al. |
| 2009/0231135 A1 | 9/2009 | Chaves et al. |
| 2010/0057534 A1 | 3/2010 | Gershkoff |
| 2010/0064327 A1 | 3/2010 | Lynch et al. |
| 2010/0070376 A1 | 3/2010 | Proud et al. |
| 2010/0189089 A1 | 7/2010 | Lynch et al. |
| 2011/0055915 A1 | 3/2011 | Hall et al. |
| 2011/0196754 A1 | 8/2011 | Proud et al. |
| 2011/0301835 A1 | 12/2011 | Bongiorno et al. |
| 2011/0313826 A1 | 12/2011 | Keen et al. |
| 2011/0314487 A1 | 12/2011 | Keen et al. |
| 2011/0314488 A1 | 12/2011 | Keen et al. |
| 2011/0314489 A1 | 12/2011 | Keen et al. |
| 2011/0314490 A1 | 12/2011 | Keen et al. |
| 2011/0314507 A1 | 12/2011 | Keen et al. |

FOREIGN PATENT DOCUMENTS

| | | |
|---|---|---|
| EP | 1415485 | 4/2011 |
| EP | 2634743 | 9/2013 |
| JP | 2005258510 | 9/2005 |
| WO | WO 2004/008277 | 1/2004 |
| WO | WO 2004/084031 | 9/2004 |
| WO | WO2006033937 | 3/2006 |
| WO | WO2006/116286 | 11/2006 |
| WO | WO2008/031114 | 3/2008 |
| WO | WO2010/080740 | 7/2010 |
| WO | WO2011/112752 | 9/2011 |

OTHER PUBLICATIONS

Airline Software—Airline Maintenance Software—airline Operations Software, http://www.ifr.aero/html/ifr_uk/products.php-?prodID=2, Jun. 2, 2009, 2 pages.

International Search Report for International Application No. PCT/IB2013/002759 dated Mar. 5, 2014.

* cited by examiner

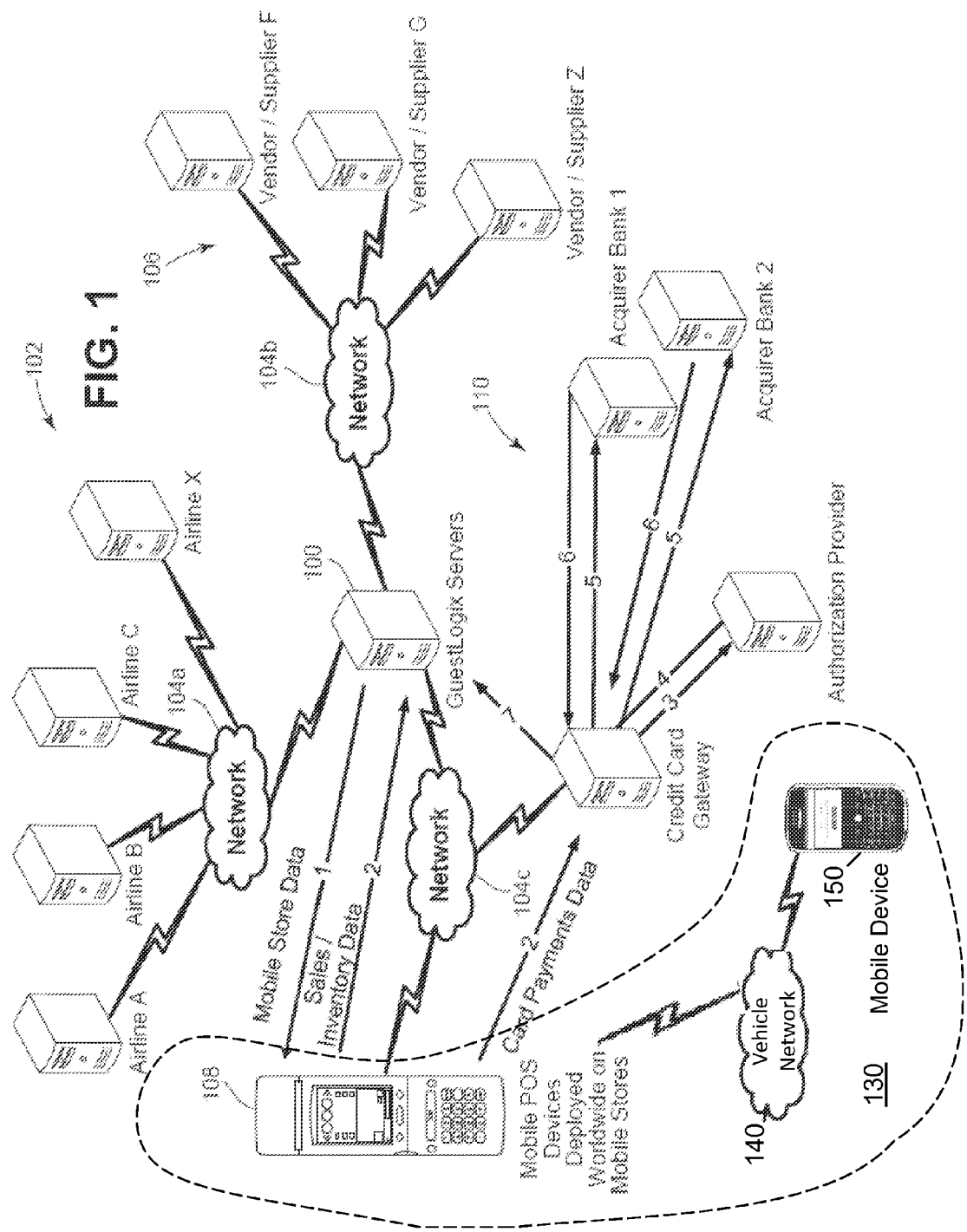

Consumer Services

| Itinerary Management | Airport Information | eWallet | Personalization Services | Subscription Services |
|---|---|---|---|---|
| Mobile Store Shopping | Budget & Expense Management | Social Networking | Location, Maps & Tracking | Reference & Translation |
| Concierge Services | Travel Guides | Local Guides & Events | Branded Catalogues | Branded Events & Ticketing |

FIG. 2D

Crew Services

208 →

| Planning/Roster Bidding | On-Board Reporting | OnTouch® Shopping | Schedule Management | Itinerary Management | Personalization Services |
|---|---|---|---|---|---|
| Day-of Communication | | | Arrival Communication | | Training/Certification Management | | Flight Connections Information |
| Layover Services/Alerts | | PAX Missed-Connections Information | | Services Reviews & References | | Manage Layover Event Changes |

Airline Services

| Ability to Manage the Store Framework | Ability to Design and Develop Consumer or Crew Mobile Apps | Ability to Integrate | Ability to Configure Merchant (MOR) Functions | Ability to Configure Crew & Retail Seller Functions |
|---|---|---|---|---|
| • Manage Supply<br>• Manage Product/Services Assortment<br>• Manage Provisioning & Publishing<br>• Retail (Merchant) Settlement<br>• Reconciliation | | • Existing Mobile Apps<br>• Frequent Flyer (Loyalty) Program<br>• Airport Information Services<br>• Operations<br>• Reservations<br>• Check-In Gate | • Manage Retail Access Points<br>• Manage Payment Types Accepted<br>• Manage Currencies and Conversion Rates<br>• Manage Integration with Payment Gateway | • Manage Incentives & Commissions<br>• Manage Sales Goals |

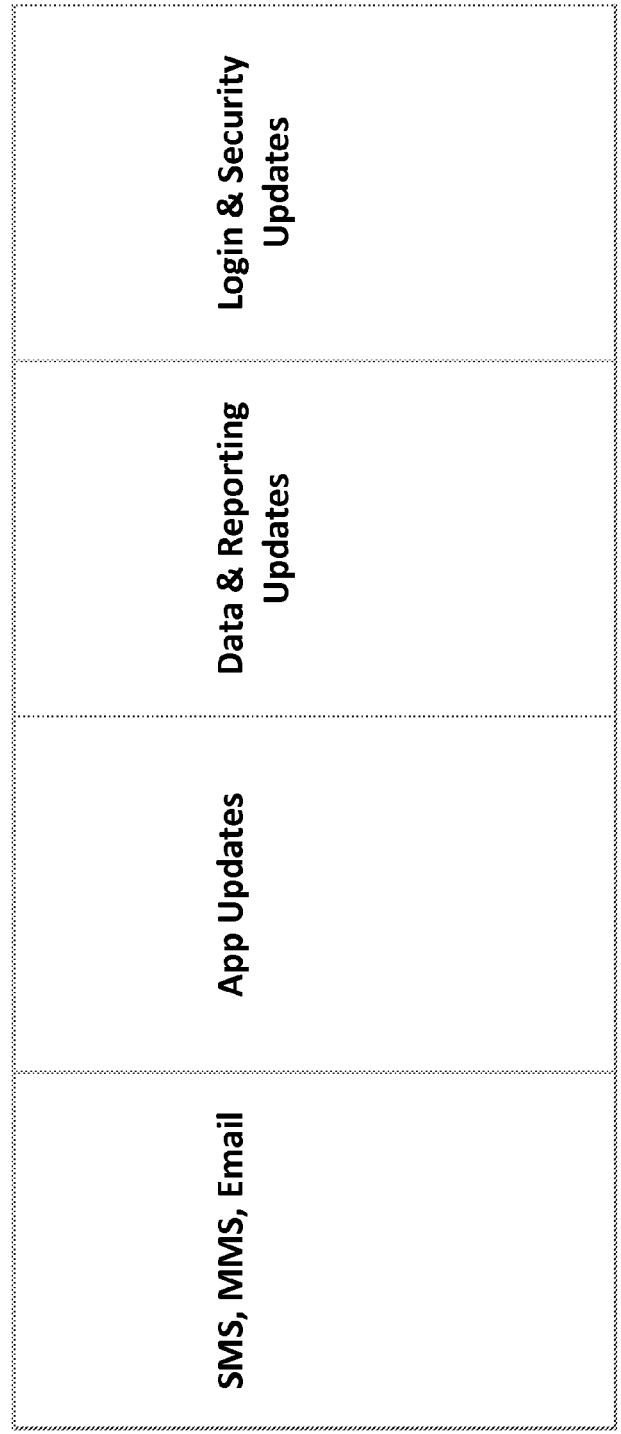

FIG. 2Q

API Services

236

For Transaction Services

- A Web Service API is provided to developers of mobile applications to interact with the mobile's platform transaction processing engine
- The Web API supports JSON/XML as data formats for requests and responses

For Crew & Content Provider for the Mobile Apps

- A Web Service API is provided to the content providers to interface with the mobile's platform to submit and modify content
- An integration API is provided to allow easy integration with Airlines' crew systems

For Single Sign-on

- A Web Service API is provided to developers of mobile applications to interact with the mobile's platform single sign-on engine
- Wrapper API to provide a uniform interface to access all the above APIs on the mobile device

SYSTEMS AND METHODS FOR INTEGRATION OF TRAVEL AND RELATED SERVICES AND OPERATIONS

PRIOR APPLICATIONS

This application claims the benefit of U.S. Provisional Applications No. 61/390,067 filed Oct. 5, 2010, and U.S. Provisional Application No. 61/530,111 filed Sep. 1, 2011, the disclosures of which are incorporated by reference herein in their entirety.

FIELD OF THE INVENTION

The invention relates generally to information technology and, more particularly, to data processing and communication systems that facilitate travel-related commerce in mobile retail environments.

BACKGROUND OF THE INVENTION

Today's travel industry is faced with a myriad of economic and operational challenges, from price pressure to rising fuel prices, to labor issues, to competition from other carriers and alternative loyalty programs, to name a few. In recent years, airlines have turned to a variety of alternative sources of revenue such as baggage check fees, charging for meals, and charging for the use of in-flight entertainment systems. Unfortunately, many of these new fees are alienating customers who have been accustomed to receiving services such as baggage checking and meals, without having to pay extra for them. Carriers are therefore seeking out opportunities to provide services that add value to their customers' travel experience, which is expected to be much better received than tactics of exacting new fees from existing services.

Airline operators, for instance, first discovered ancillary revenue opportunities through advertising sales in their branded on-board magazines and buy-on board programs involving duty-free goods. This eventually spread to online bookings and self-check-in options. Today, airlines are using their web sites to sell seats, insurance, car rentals and hotel reservations. Others have extended this buying to on-board programs to provide a la carte meals and drinks, lottery tickets, phone cards, on-demand entertainment, and more. With the advent of on-board Wi-Fi communications airlines are moving into a position to reap more profits from their captive audiences than ever before.

Although the opportunity to tap the market of in-transit passengers has been known for decades, a number of particular challenges has prevented deployment of a commercial infrastructure to in-transit passengers. For example, crew personnel are not retail sales staff and would need to be trained to acquire retail sales skills. Also, there are practical difficulties in transacting with customers who are passengers seated throughout the airplane. Furthermore, importantly, the retail environment in a moving vehicle is dynamic, meaning that the inventory and services available for purchase are entirely dependent on the unique characteristics of each flight leg.

Another factor specific to mobile retail is that passengers are often on a travel itinerary having stopovers or changeovers, such that the particular flight on which a given passenger may be enticed to make a purchase is not the final leg of that passenger's travel. In this scenario, for items purchased on-board to be delivered at the destination point, the inventory from which a passenger may shop is unique to the passenger's itinerary.

U.S. patent application Ser. No. 12/481,505, the disclosure of which is incorporated by reference herein, describes a solution for linking a passenger's travel itinerary to mobile retail environments with their specific product or service offerings, and for coordinating sales, provisioning, and other critical activities in connection with conducting sales or delivery of goods and services to or from those mobile retail environments. This approach facilitates pre-ordering goods or services for delivery to the customer on a vehicle or at a destination. A Web-based application is contemplated for pre-ordering goods prior to boarding the vehicles, which is linked to a back office system that tracks flight schedules, traveler itineraries, provisioning and stocking information, etc. On board the vehicles, point-of-sale devices that can display available goods or services, guide customers through a shopping session, and even take a payment, are described. These may take the form of a hand-portable device that can be operated or brought to customers by flight attendants, or a seat-back entertainment system. These devices are updated with inventory and other relevant information whenever a network connection is, or becomes, available, such as at destination points.

One drawback with the deployment of portable in-vehicle point-of-sale systems is their limited quantity aboard any vehicle. Thus, only a small fraction of the passengers can use them to browse or purchase goods or services at any one time. Seat-back entertainment systems are more widely distributed, but only on aircraft where they are available. Thousands of older aircraft in use today do not have such systems available. Moreover, seat-back systems vary in their capabilities, with many being display-only devices lacking user interactivity capability to support a shopping session.

Mobile devices such as smartphones, tablets, and the like, have become ubiquitous in recent years. In 2010, for example, about one-third of all mobile phones were smartphones. Smartphones are mobile devices that combine the functionality of a personal digital assistant and a mobile telephone. These devices have significant data communications and computing capability, along with a display and input device technology capable of facilitating effective user interaction with the quantity of information that the devices can support. Popular examples of smartphones include products manufactured by Research In Motion Inc. under the Blackberry® brand, the iPhone® by Apple Inc., and a variety of devices running Google's Android, Nokia's Symbian and Microsoft's Windows Phone 7, operating systems.

Although smartphones, like any other computing device with network connectivity, can be used to pre-order goods or services (prior to boarding) for later delivery in a mobile retail environment, their conventional use for shopping and placing orders while en route is limited to only those flights where Internet connectivity is available. In reality, Internet service is not currently available on all aircraft and all airlines. When it is available, there is typically a charge to access the service, which may dissuade certain users. Additionally, there are practical bandwidth limitations or limitations on the number of users that can be supported at any given time on a flight. Accordingly, although it is likely that a majority of passengers on a flight are carrying a smartphone, there is currently a lost opportunity to leverage that technology in order to facilitate the sale of goods or services through such devices on-board.

SUMMARY OF THE INVENTION

One aspect of the invention is directed to integrating mobile devices, such as smartphones, tablets, and the like, into a travel and mobile retail environment commercial system. In one embodiment, a mobile device includes a mobile store module that provides an interactive user experience that allows a traveler to browse goods or services that are available in the mobile retail environment. The device further includes a mobile store inventory records module that maintains records of goods and services that are available in each particular mobile retail environment. An update module included in the mobile device facilitates data connectivity with a remote server to update the stored data in the mobile store inventory records module. The remote server, in turn, is communicatively coupled with a transportation service provider system, such as an airline business system that provides information on individual travelers and their itineraries. The mobile device further includes an in-flight data exchange module that facilitates interaction with a point-of-sale device.

BRIEF DESCRIPTION OF THE DRAWINGS

The invention may be more completely understood in consideration of the following detailed description of various embodiments of the invention in connection with the accompanying drawings, in which:

FIG. 1 is a block diagram illustrating a general arrangement for a mobile retail environment system according to one embodiment.

Figure 2A:
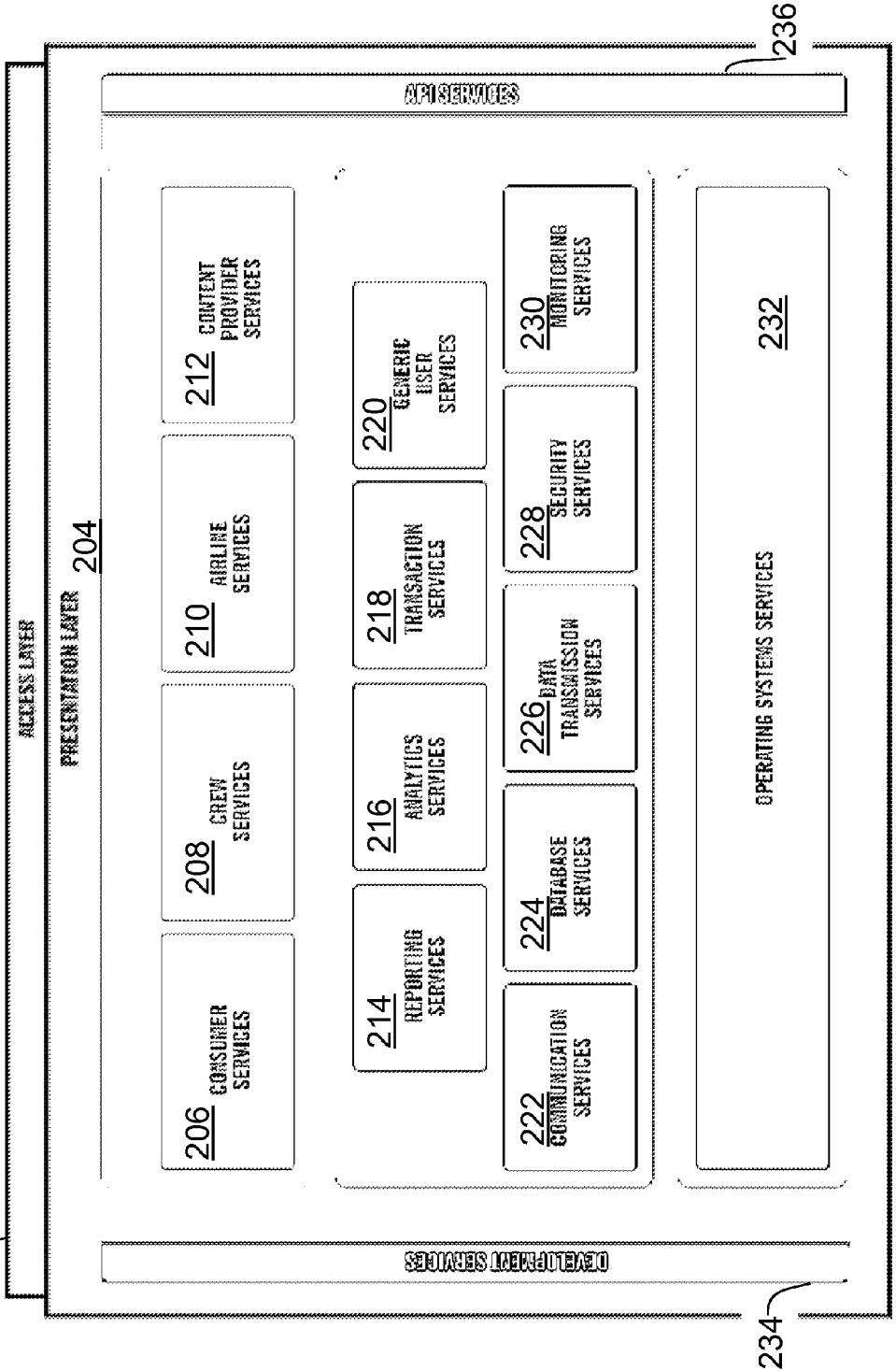
FIG. 2A is an architecture diagram illustrating various access layer and presentation layer services provided by the system of FIG. 1 according to one embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

One aspect of the invention is directed to integrating mobile devices, such as smartphones, tablets, and the like, into a travel and mobile retail environment commercial system. The retail environment is termed mobile because the place where the shoppers are located is a vehicle, such as an aircraft, train, ship, bus, automobile, and the like. For the sake of simplicity, the embodiments of the invention detailed below shall be described in the context of an aircraft, where the shoppers, or customers, are passengers that are either on board the aircraft, or are persons who will be present on board the aircraft at a specified future time. In this case, the operator of the aircraft, or the carrier, is an airline company. It will be understood, however, that the invention as a whole is not limited to the case of airlines and aircraft as the mobile environment in which the mobile retail environment is facilitated, unless such a limitation is expressly made in a claim, in which case only that claim shall be so limited. Persons of skill in the relevant arts will appreciate that principles of the invention can be applied to any suitable type of vehicle and transportation service.

FIG. 1A is a top-level system diagram illustrating various interactions between some of the components of a mobile retail environment according to one type of embodiment. The Servers 100 interface with computer systems of each of airlines A, B, C, and X (collectively, airlines 102) over computer network 104a. The Servers 100 can utilize any suitable arrangement known in the art using well-known hardware and software platforms for their basic operation. The specific system implementation that embodies aspects of the invention utilizing the basic platforms will be detailed below. Servers 100 also interface with computer systems of each of vendors/suppliers F, G, and Z (collectively, vendors 106) via network 104b. Network 104b can be the same network as network 104a (e.g., the Internet), or they can be entirely separate networks.

Servers 100 are further interfaced with payment processing system 110, including a credit card gateway, an authorization provider, and acquirer banks, as illustrated in FIG. 1A. These systems communicate with a back office system (BOS) of Servers 100 to automate the completion of financial transactions.

Servers 100 are also interfaced with point-of-sale (POS) devices 108 situated on-board each of the aircraft 130, via network 104c, which can be the same as, or different, from networks 104a and 104b. There can be one or more POS devices 108 on each aircraft. POS devices 108 are computer devices that have a display device and a user input device, such as a keyboard or touchscreen, for example. POS devices also have a processor, memory, and communications circuitry. In one type of embodiment, POS devices 108 are hand-portable devices that may include a receipt printer and credit card reader. Other forms of input devices, such as a bar code reader, may be included. In another type of embodiment, POS devices 108 are mounted on-board the aircraft, such as in the back of most seats or in the bulkhead walls. These types of devices can be integrated with on-board media players that display videos and videogames, output sound to a set of headphones, and can include a touchscreen, videogame controller, or a variety of other input and output devices.

In one type of embodiment, equipment on each aircraft 130 supports a vehicle network 140. Vehicle network 140, in one embodiment, includes Wi-Fi wireless connectivity between devices in the network and can include one or more servers, internetworking devices such as routers or firewalls, and end-point devices such as POS devices 108 and mobile devices 150. In another embodiment, vehicle network 140 is an ad-hoc network in which POS devices 108 can communicate with one another or with other devices directly, thereby establishing the vehicle network 140.

Mobile device 150 represents a passenger or crew member's own personal device that can connect to vehicle network 140. Mobile device 150 can be a smartphone, tablet, laptop PC, netbook, or any other portable information device. Generally, it is contemplated that mobile device 150 regularly connects to a wide area network such as the Internet on a regular basis, such as via cellular data networks like LTE (4G), HSPA+ (3G), GSM/3GSM, or the like, through a service provided by a communications carrier. Other types of mobile devices 150 connect to a wide area network via Wi-Fi or Wi-MAX access points such as hotspots at airports and those provided by municipalities or businesses.

In general, servers 100 facilitate information exchange with the airlines 102 to obtain each traveler's itinerary and other critical information, with vendors or suppliers 106 to obtain and provide information concerning goods or services to be sold and ultimately delivered during travel or at each traveler's destination. Servers 100 establish mobile stores that exist temporarily, such as during a flight from departure to arrival and exchange all critical information relating to merchandising and sales with POS devices 108. In one particular aspect of the invention, information pertaining to flight schedules, departures, destinations, and status, as well as individual passenger identification and itineraries, and crew information, received from the various airlines, is combined with information relating to the various products and services, received from the various vendors or suppliers of those products and services, to specifically define each mobile retail environment. The mobile retail environment can be vehicle-specific, and vehicle- and passenger-specific. In another embodiment, the mobile retail environment can further be crew-specific. For passengers having travel itineraries with connection points, those passengers may experience multiple different mobile retail environments, with each environment corresponding to each leg of their travel.

In a simple scenario, servers 100 are in constant communication with each vehicle, and are able to conduct merchandising and sales in real-time to travelers on-board the vehicles. In practice, however, the on-board store during transit oftentimes does not have this connection. For instance, it is still common for aircraft to not be equipped with in-flight Internet connectivity. Accordingly, in these scenarios, POS devices 108 are communicated with and updated between flights.

Figure 2B:
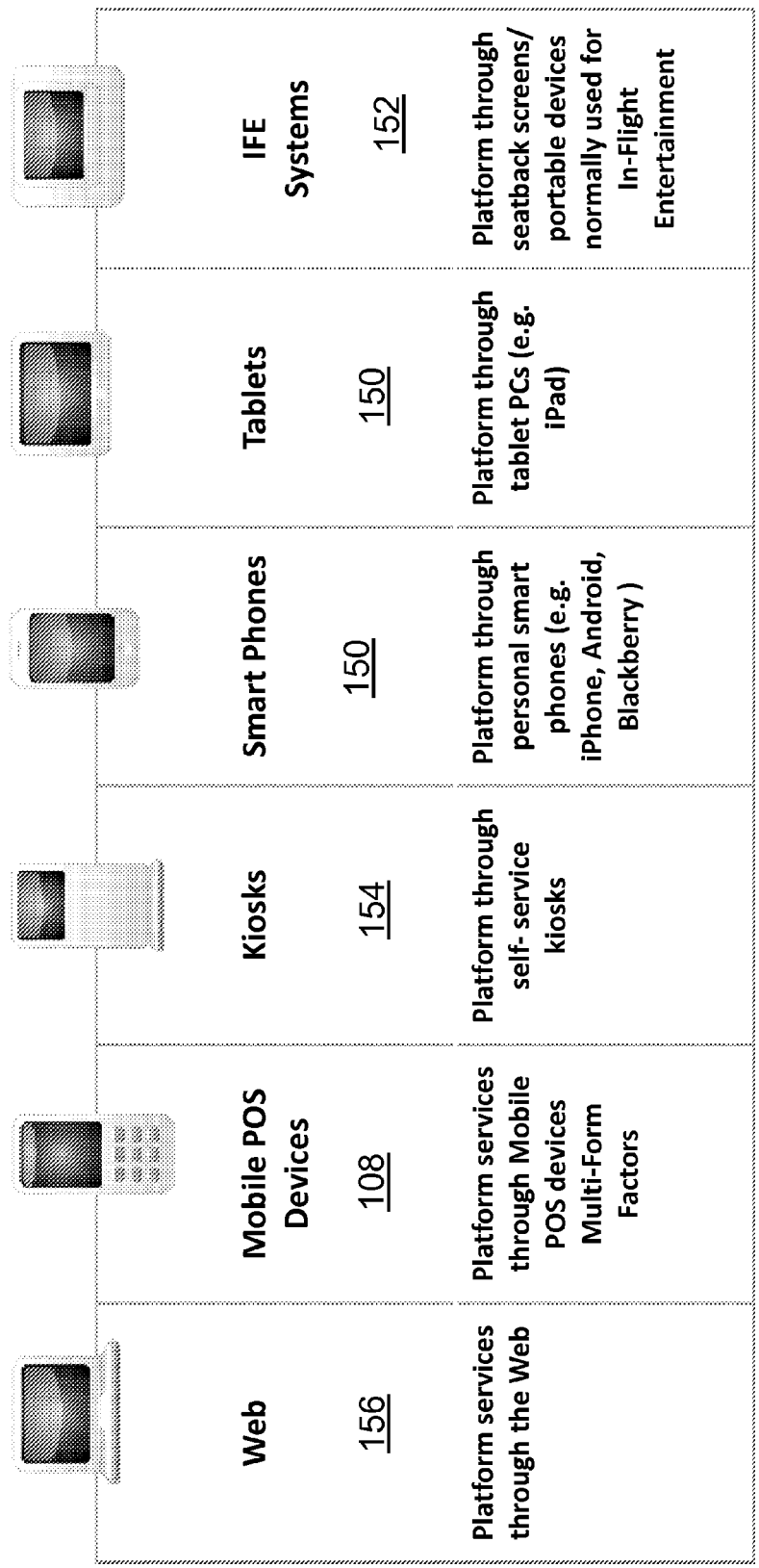
FIGS. 2B-2Q are block diagrams illustrating examples of each of the services of FIG. 2A.
Figure 2G:
FIG. 2C is a block diagram illustrating modules implemented in a mobile device according to one embodiment which enable the mobile device to become integrated into the system of FIG. 1.
Figure 21:
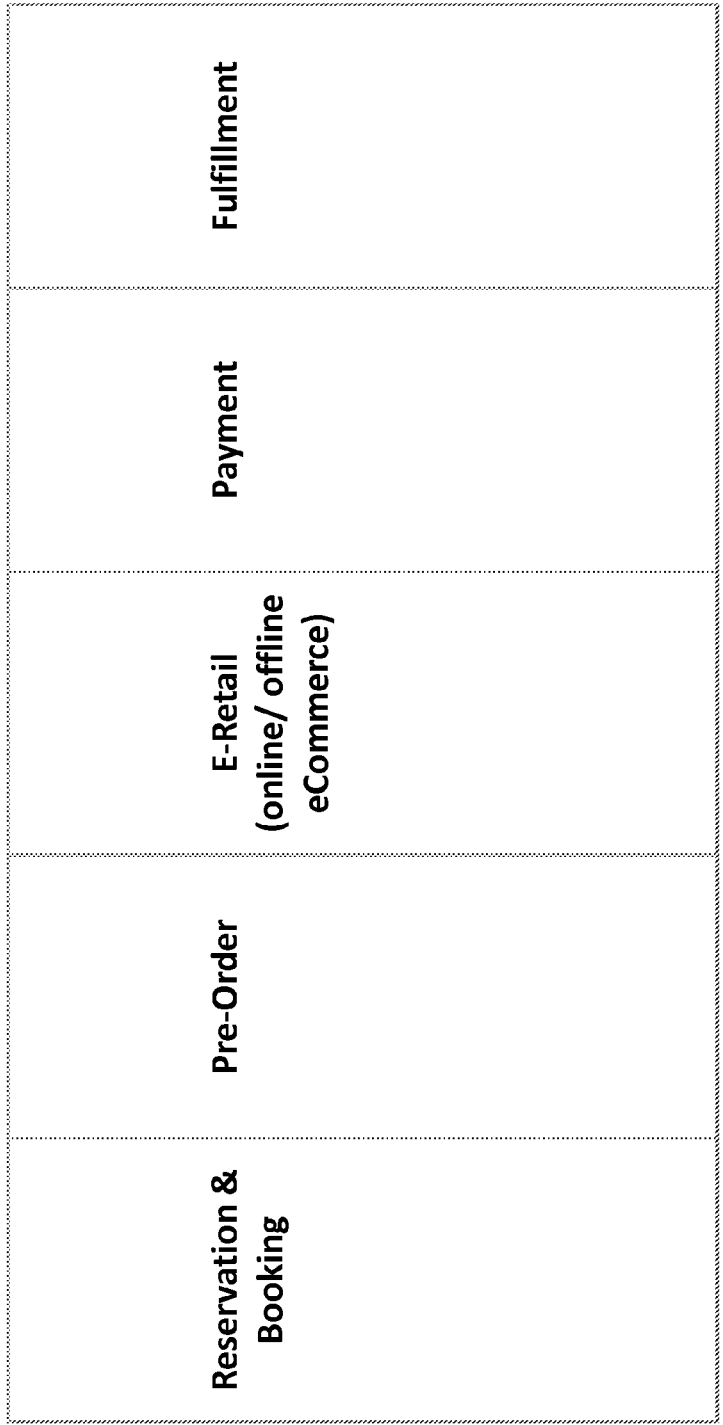
Figure 2L:
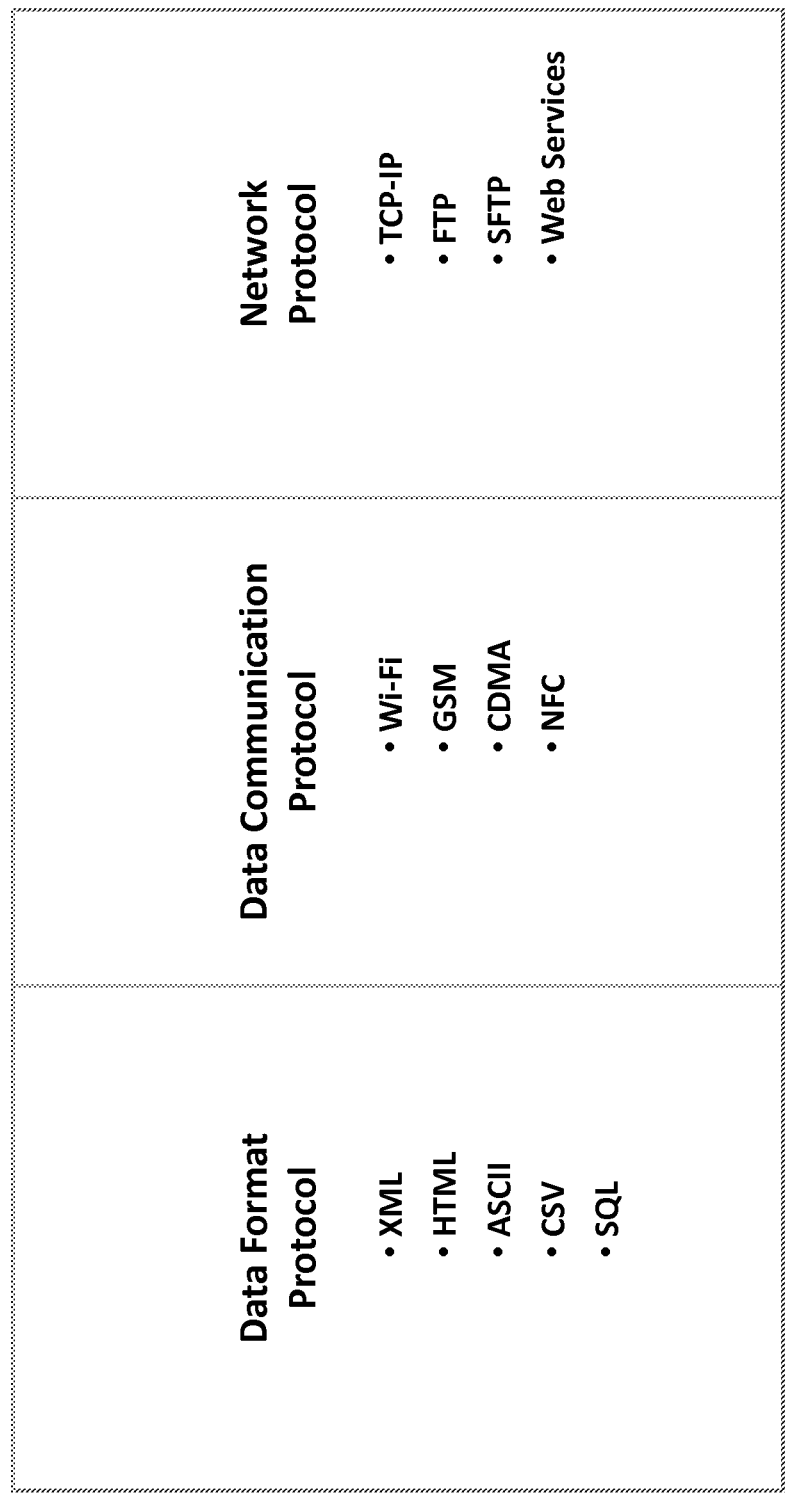
Figure 2M:
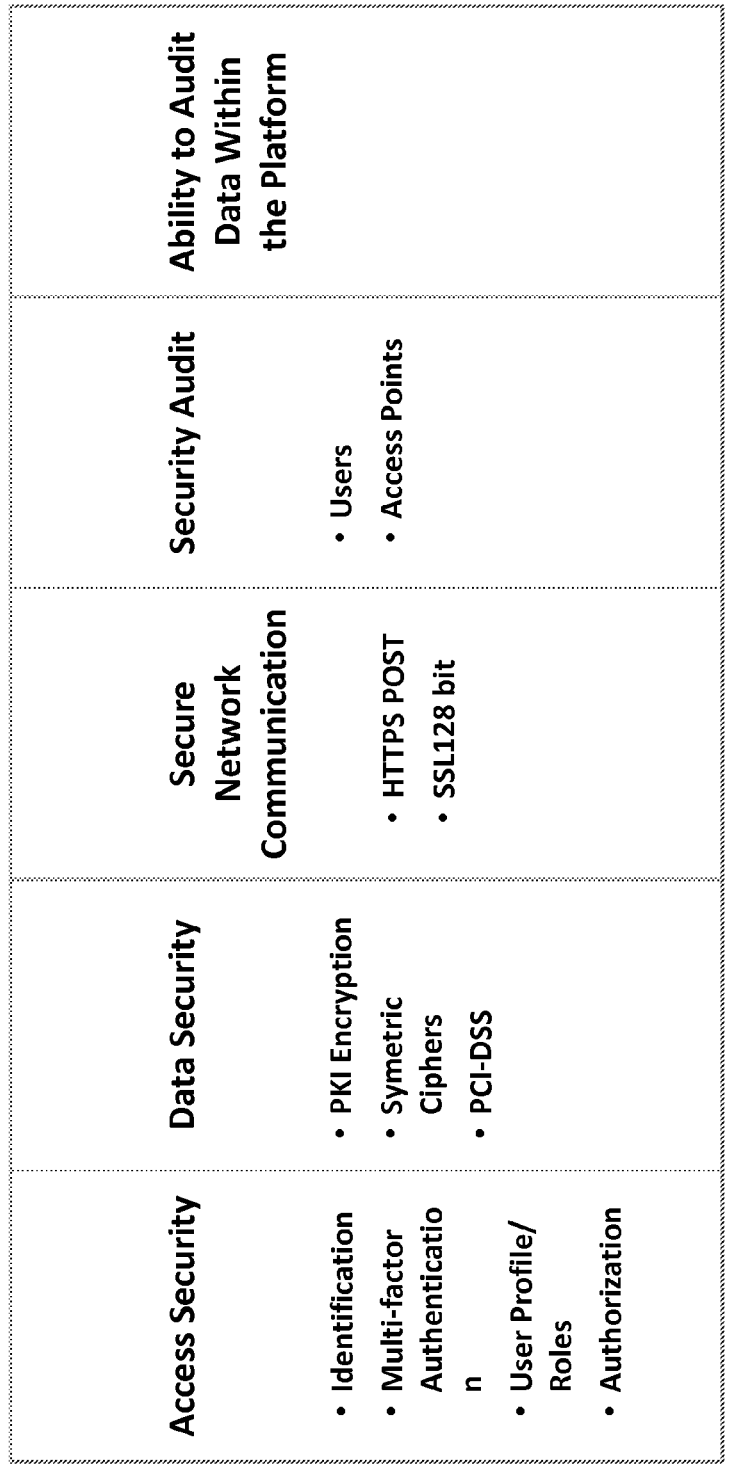
Figure 2N:
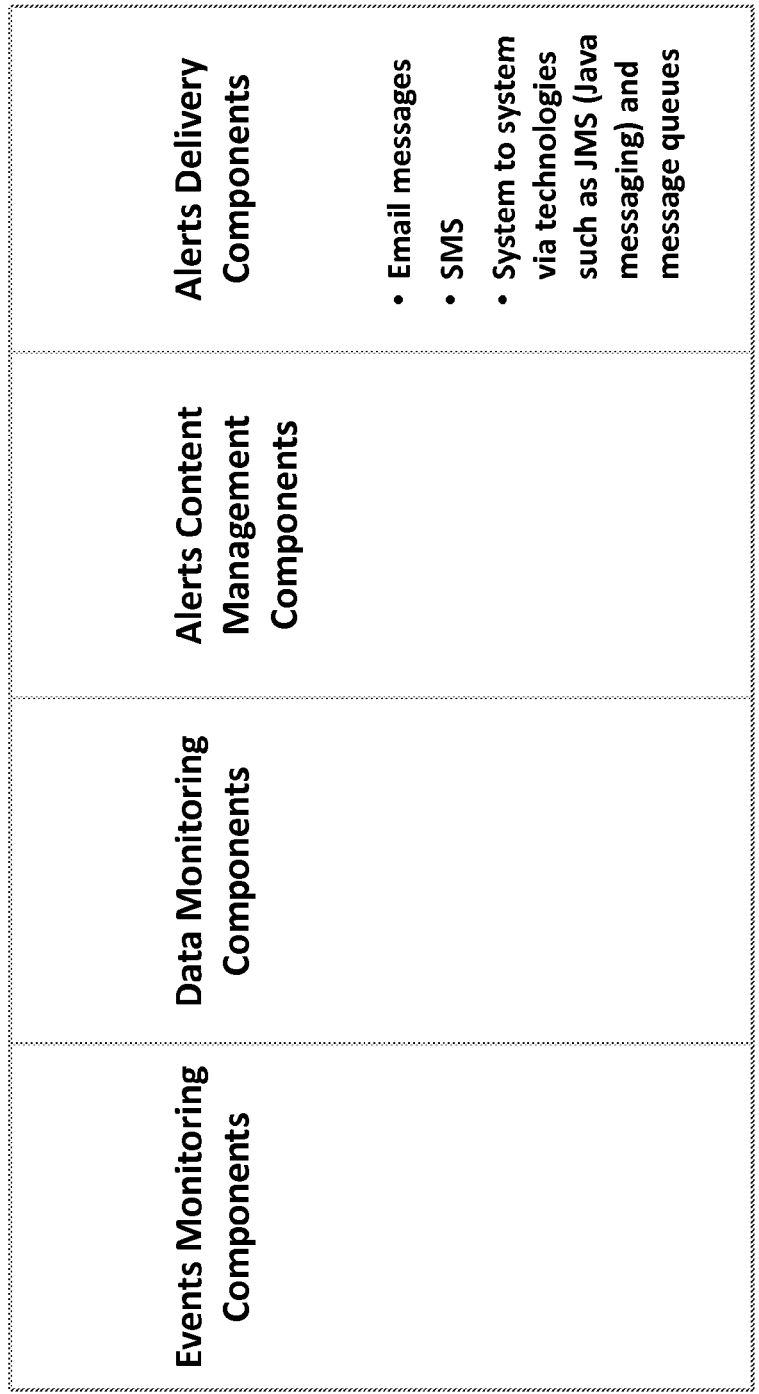
Figure 2P:
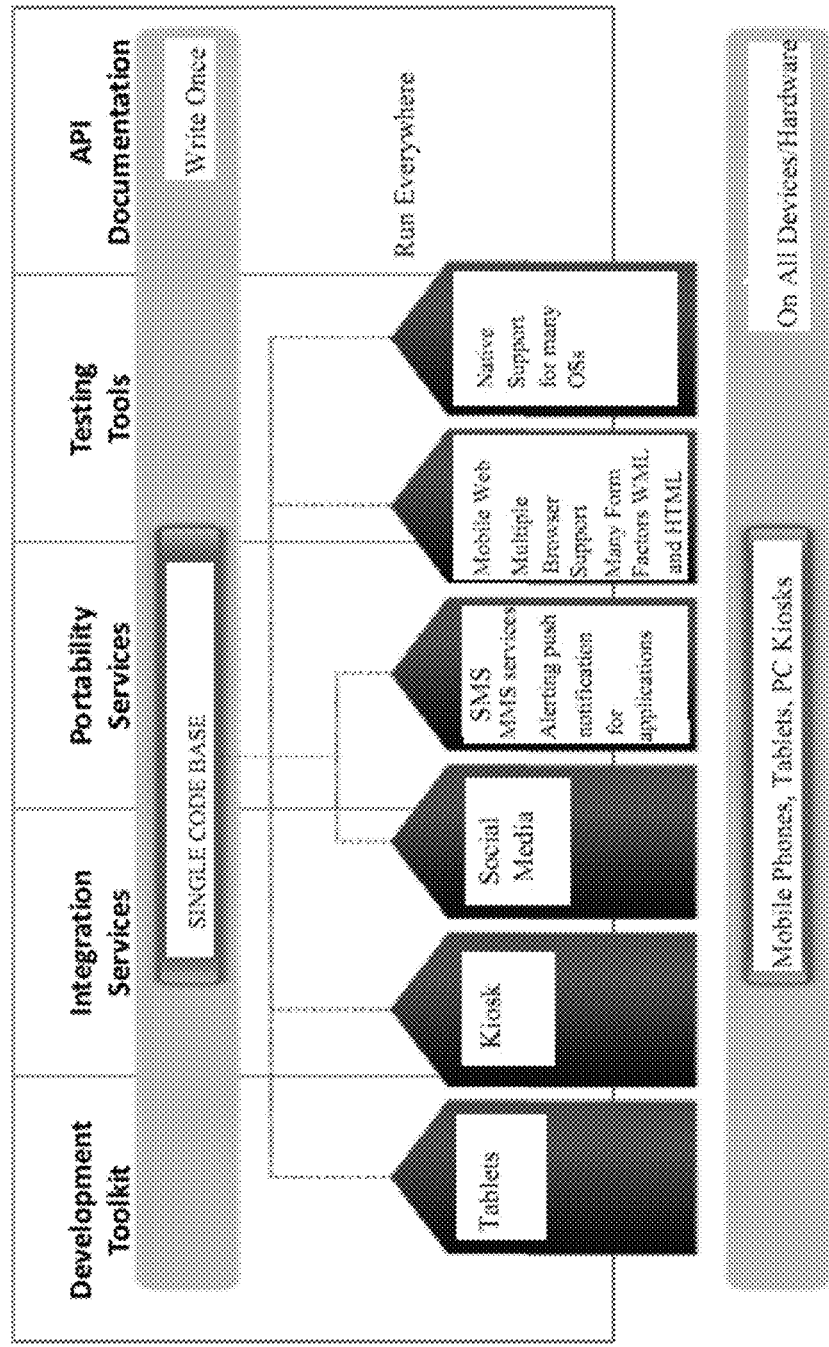

FIG. 2A illustrates a system functional architecture according to one embodiment that supports integration of devices 150 into the mobile retail environment. System 200 includes access layer 202 and presentation layer 204. Access layer 202, illustrated in FIG. 2B, includes devices such as POS devices 108, mobile devices 150, in-flight entertainment systems (i.e. seat-back) devices 152, kiosk devices 154, and any general device with a Web browser 156.

Presentation layer services 204 interface with access layer devices to provide consumer services 206, crew services 208, airline services 210, content provider services 212, reporting services 214, analytics 216, transaction services 218, generic user services 220, communication services 222, database services 224, data transmission services 226, security services 228, monitoring services 230, operating systems services 232, development services 234, and API services 236. Each of these services can be accessed through one or more of the access services 202. Examples of each of these services are illustrated, respectively, in FIGS. 2C-2Q.

Figure 3:
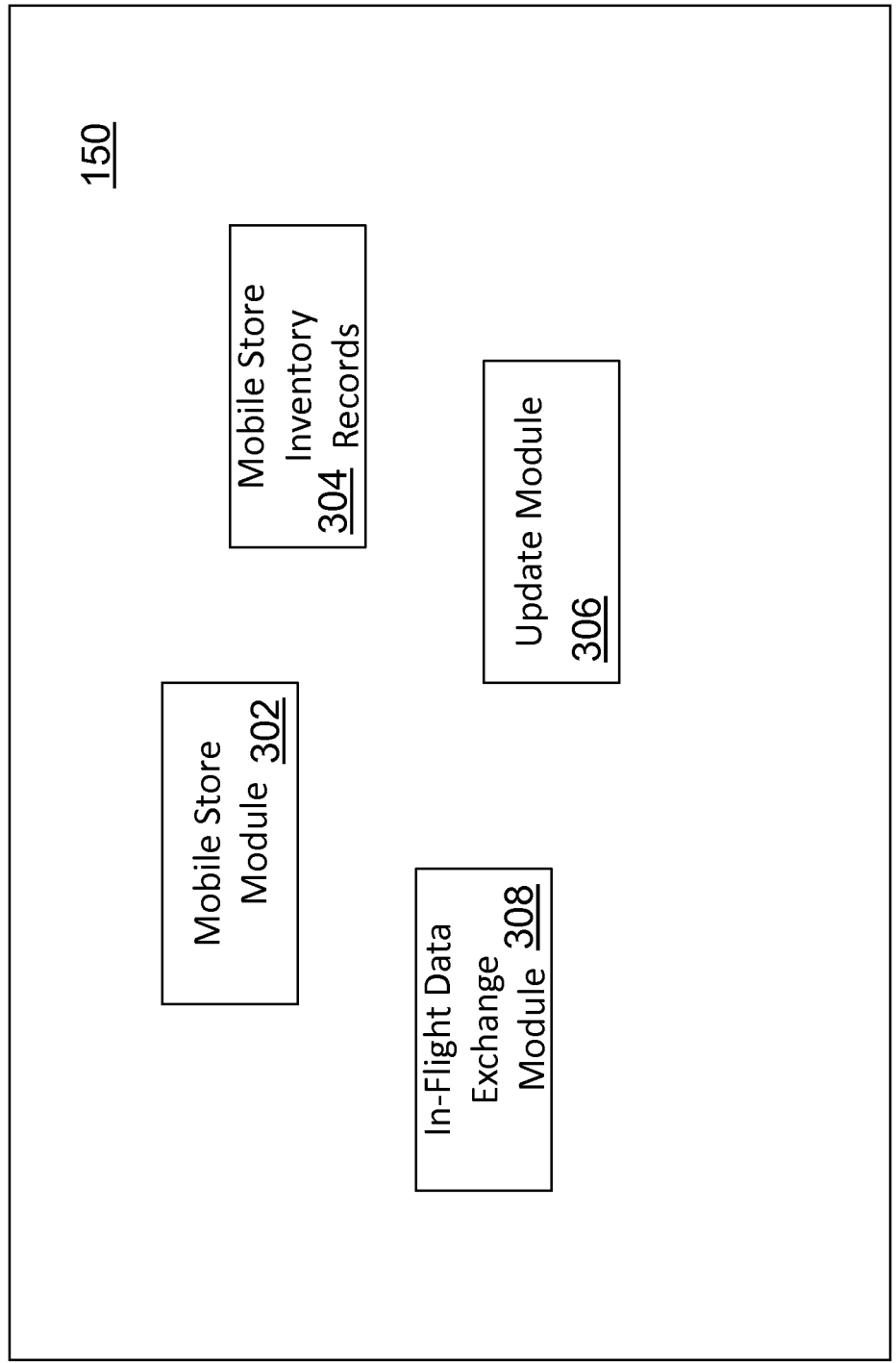

In another aspect of the invention, off-line sales on-board a mobile retail environment are supported using mobile devices 150. Referring to FIG. 3, in one embodiment, mobile device 150 is configured with specific modules to support off-line in-flight purchases. The term "module" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more general purpose computers (such as the one described in greater detail below) that execute an operating system, system programs, and application programs, while also implementing the module using multitasking, multithreading, distributed (e.g., cloud) processing, or other such techniques. Accordingly, each module can be realized in a variety of suitable configurations, and should not be limited to any particular implementation exemplified herein.

In one particular embodiment, mobile device 150 includes mobile store module 302, mobile store inventory records module 304, update module 306, and in-flight data exchange module 308. In a related embodiment, these four modules are implemented using an application, or "app," that is downloaded to mobile device 150 and installed to execute on the device. Once the app is installed, the program instructions of the app configure the computing hardware of mobile device 150 to implement modules 302, 304, 306, and 308. Mobile store module 302 provides an interactive user experience that allows the traveler to browse goods or services that are available in the mobile retail environment. The mobile retail environment is defined in one sense based on what is actually available. To this end, mobile store inventory records module 304 represents the goods and services that are available in each particular mobile retail environment. Update module 306 facilitates data connectivity, with servers 100 to update the stored data in module 304. In one embodiment, for flight, or each leg of a particular itinerary, update module 306 receives appropriate inventory information. In-flight data exchange module 308 facilitates interaction with a POS device 108.

Figure 4A:
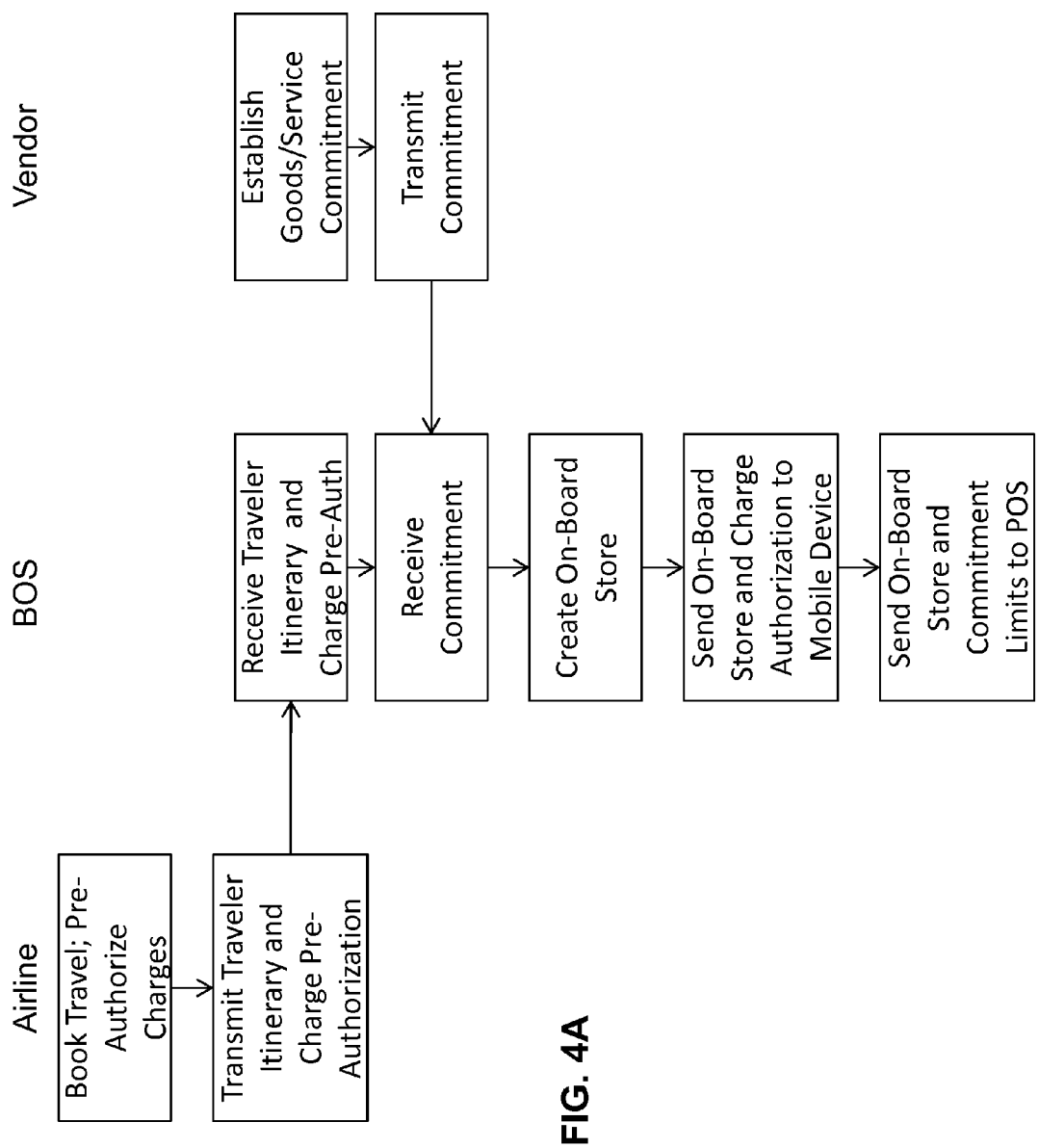
FIGS. 4A and 4B are flow diagrams illustrating a preparation process and an in-flight offline process to facilitate a sale in a mobile retail environment according to one embodiment of the present invention.

FIG. 4A is a flow diagram illustrating a process for preparing mobile device 150 for an off-line mobile retail environment according to one example embodiment. Each of the three columns labeled Airline, BOS (back office system) and Vendor represents a sequence of events performed by each respective system. First, a passenger books travel with the airline. This can be done online or via telephone with a customer service representative. As part of the booking process, the customer, who is the traveler-to-be at this stage, authorizes a certain amount of charges on his or her credit card. This amount can be processed at this early stage and held to ensure payment in reconciliation. The customer's travel itinerary including the traveler's identity and flight information, as well as the charge authorization information, are transmitted to the back-office system on servers 100.

The Vendor establishes a goods or services commitment with the BOS. This process involves the vendor essentially guaranteeing that the goods or services in certain committed amounts will be available to travelers in the mobile retail environment. For instance, if the vendor is a tour operator at a destination, then a commitment represents a reservation of a certain number of customer spots available in each of the tours being offered. The commitment is transmitted to the BOS.

The BOS receives the traveler and charge authorization from the airline, and receives the commitment information from the vendor. Using this information, the BOS creates the on-board store. The on-board store in this case describes the goods and services that are available to travelers on each particular flight.

The traveler has mobile device 150 and the device is configured with update module 306. Update module 306 causes mobile device 150 to connect periodically, or on a push basis in response to events such as itinerary creation or changes, with servers 100 and receive mobile store inventory records to be kept by module 304. These records are specific to the traveler's itinerary and represent only those items which are available to the traveler on his or her flight(s).

The servers 100 also send the on-board store information, along with commitment limits provided by the vendor to the POS devices 108 that will be available on the flight(s).

Figure 4B:
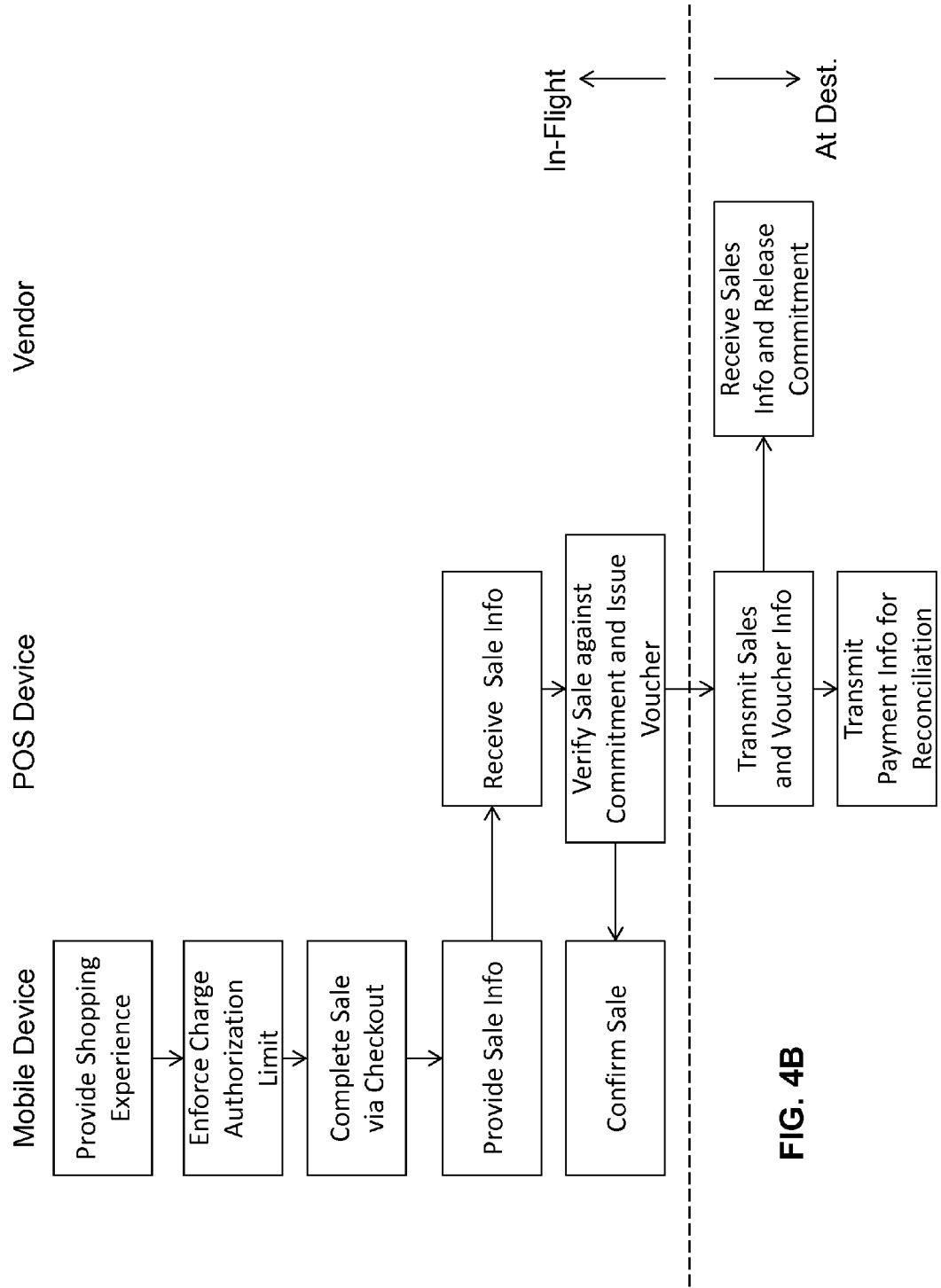

Referring now to FIG. 4B, the three columns represent actions taken by mobile device 150, POS device 108, and the Vendor. In the flight, mobile store module 302 on the mobile device provides a shopping experience to the traveler. In the shopping experience, the charge authorization limits established at the time of booking of the flight are enforced. Once the traveler selects the good or services he or she wishes to buy, the sale is completed via checkout using a shopping cart process or other suitable user-friendly process.

At this stage, the sale information is provided to POS device 108, which proceeds to check if the selected goods or services are still available (since other shoppers may have preempted this traveler insofar as the commitment amounts are concerned). This information may be transmitted to the POS device over vehicle network 140. Alternatively, this information may be generated in the form of a bar code, which is displayed on the screen of mobile device 150 and read by a bar code reader on POS device 108. Once the sale is verified against the commitments by the Vendor, a voucher is issued to the traveler (e.g., in the form of a printed-out slip, or in the form of a numerical code associated with the completed transaction) and the sale is confirmed for the traveler.

At the destination, POS device 108 transmits the sales and voucher codes to the Vendor, who is now prepared to deliver the goods or services to the traveler upon his or her arrival. Also, the payment information is provided to servers 100, which will be used for reconciliation with the credit card issuer.

This exemplary approach avoids having to take payment on-board, and ensures that the traveler is offered only goods and services that are available, thereby virtually eliminating the need for charge-backs due to the carrier's fault.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A computer-implemented method for configuring a personal mobile retail environment for off-line shopping that utilizes a mobile device of a traveler, the personal mobile retail environment being associated with specific scheduled itinerary including a departure time, a departure location, a destination arrival time and a destination arrival location, and a transit period that exists when the mobile retail environment is traveling between the departure location and destination arrival location, the method comprising:

receiving, by a computer system via a computer network, prior to the departure time, itinerary information relating to the traveler;

receiving, by the computer system via a computer network, prior to the departure time, commitment information representing vendor/supplier-committed availability of the goods or services for purchase during the transit period and available for delivery during the transit period or at the destination arrival location;

generating, by the computer system, prior to the departure time, an on-board store definition based on the itinerary information and commitment information, wherein the on-board store definition includes a description of the goods or services that are available for purchase in the personal mobile retail environment in the transit period and excludes goods or services that are unavailable for purchase in the personal mobile retail environment in the transit period; and sending, by the computer system via a computer network, the on-board store definition to the mobile device of the traveler prior to the departure time, wherein the on-board store definition facilitates off-line shopping in the personal mobile retail environment using the mobile device of the traveler.

2. The method of claim 1, further comprising:

receiving, by the computer system via a computer network, charge pre-authorization information representing a monetary limit for the personal mobile retail environment.

3. The method of claim 2, wherein in receiving the charge pre-authorization information, the charge pre-authorization information is provided by a transportation provider information system.

4. The method of claim 2, further comprising:

sending, by the computer system via a computer network, the on-board store definition and commitment information to a point-of-sale device to be located in the mobile retail environment during the transit period.

5. A system for configuring a personal mobile retail environment for off-line shopping that utilizes a mobile device of a traveler, the personal mobile retail environment being associated with specific scheduled itinerary including a departure time, a departure location, a destination arrival time and a destination arrival location, and a transit period that exists when the mobile retail environment is traveling between the departure location and destination arrival location, the system comprising:

a back-office system of at least one computer server configured to be communicatively coupled with a transportation provider information system, a vendor/supplier information system, a point-of-sale device on-board a vehicle, and the mobile device of the traveler, wherein the back-office system is configured to:

receive itinerary information relating to the traveler provided by the transportation provider information system prior to the departure time;

receive commitment information representing vendor/supplier-committed availability of the goods or services for purchase during the transit period and available for delivery during the transit period or at the destination arrival location, the commitment information being provided by the vendor/supplier information system prior to the departure time;

generate an on-board store definition prior to the departure time based on the itinerary information and commitment information, wherein the on-board store includes a description of the goods or services that are available in the personal mobile retail environment in the transit period and excludes goods or services that are unavailable for purchase in the personal mobile retail environment in the transit period; and send the on-board store definition to the mobile device of the traveler prior to the departure time, wherein the on-board store definition facilitates off-line shopping in the personal mobile retail environment using the mobile device of the traveler.

6. The system of claim 5, wherein the back-office system is further configured to receive charge pre-authorization information representing a monetary limit for the personal mobile retail environment.

7. The system of claim 6, wherein the back-office system is further configured to receive charge pre-authorization information as provided by the transportation provider information system.

8. The system of claim 6, wherein the back-office system is further configured to send the on-board store definition and commitment information to a point-of-sale device to be located in the mobile retail environment during the transit period.

9. The method of claim 2, further comprising:
in response to receiving the charge pre-authorization information, sending, by the computer system via a computer network, a purchase limit based on the charge pre-authorization information to the mobile device of the traveler prior to the departure time.

10. The method of claim 1, further comprising:
receiving, by the computer system via a computer network after the destination arrival time, information indicative of a completion of a purchase by the traveler in the personal mobile retail environment in the transit period.

11. The system of claim 6, wherein the back-office system is further configured such that, in response to receiving the charge pre-authorization information, the back-office system sends a purchase limit based on the charge pre-authorization information to the mobile device of the traveler prior to the departure time.

12. The system of claim 5, wherein the back-office system is further configured to receive, after the destination arrival time, information indicative of a completion of a purchase by the traveler in the personal mobile retail environment in the transit period.

* * * * *